United States Patent
Loritz et al.

(10) Patent No.: US 9,141,728 B2
(45) Date of Patent: *Sep. 22, 2015

(54) METHODS AND SYSTEMS FOR CREATING AND USING AN ADAPTIVE THESAURUS

(71) Applicant: LexisNexis, a division of Reed Elsevier Inc., Miamisburg, OH (US)

(72) Inventors: Donald Loritz, Springboro, OH (US); Shian-jung Chen, Springboro, OH (US); Narasimha Edala, New Albany, OH (US); Harry Silver, Shaker Heights, OH (US)

(73) Assignee: LexisNexis, a division of Reed Elsevier Inc., Miamisburg, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/897,093

(22) Filed: May 17, 2013

(65) Prior Publication Data

US 2013/0254220 A1  Sep. 26, 2013

Related U.S. Application Data

(63) Continuation of application No. 12/362,940, filed on Jan. 30, 2009, now Pat. No. 8,463,806.

(51) Int. Cl.
*G06F 7/00* (2006.01)
*G06F 17/30* (2006.01)
*G06F 17/27* (2006.01)

(52) U.S. Cl.
CPC ...... *G06F 17/30976* (2013.01); *G06F 17/2795* (2013.01); *G06F 17/30672* (2013.01)

(58) Field of Classification Search
CPC .................. G06F 17/30687; G06F 17/30864; G06F 17/30336; G06F 17/30474; G06F 17/3064; G06Q 10/02; G06Q 30/06; G06Q 30/0601; G06Q 30/08; Y10S 707/99933; Y10S 707/99934; Y10S 707/99935; Y10S 707/99944; Y10S 707/99936; Y10S 707/99942
See application file for complete search history.

(56) References Cited

U.S. PATENT DOCUMENTS 5,297,039 A   3/1994   Kanaegami et al.
5,675,819 A   10/1997  Schuetze (Continued)

FOREIGN PATENT DOCUMENTS

WO    WO 2007/100812 A2    9/2007

OTHER PUBLICATIONS

An Overview of Query Optimization in Relational Systems, Chaudhuri S. PODS, pp. 34-43, 1998.*

(Continued)

*Primary Examiner* — Augustine K Obisesan
(74) *Attorney, Agent, or Firm* — Dinsmore & Shohl LLP

(57) ABSTRACT

Methods and systems are provided for creating an adaptive thesaurus. A term pair including an index term and an expansion term is received. A recall gain, an expansion independence, and a semantic similarity of the term pair are calculated using a processor. Whether to store the term pair is determined based on the recall gain, the expansion independence, and the semantic similarity. The term pair is stored based on the determination. Methods and systems are provided for searching using an adaptive thesaurus. A search query including a query term is received. An expansion term stored in association with an index term matching the query term in the adaptive thesaurus is retrieved. Using a processor, the search query is expanded using the expansion term based on a recall gain, an expansion independence, and a semantic similarity.

21 Claims, 3 Drawing Sheets

(56) References Cited

U.S. PATENT DOCUMENTS

| | | | |
|---|---|---|---|
| 5,926,811 | A | 7/1999 | Miller et al. |
| 6,298,342 | B1* | 10/2001 | Graefe et al. ............... 707/602 |
| 6,480,843 | B2 | 11/2002 | Li |
| 6,502,081 | B1 | 12/2002 | Wiltshire, Jr. et al. |
| 6,711,563 | B1 | 3/2004 | Koskas |
| 6,941,297 | B2 | 9/2005 | Carmel et al. |
| 7,636,714 | B1 | 12/2009 | Lamping et al. |
| 2002/0059161 | A1 | 5/2002 | Li |
| 2002/0099700 | A1 | 7/2002 | Li |
| 2003/0028512 | A1 | 2/2003 | Stensmo |
| 2003/0093408 | A1* | 5/2003 | Brown et al. ............... 707/2 |
| 2003/0158725 | A1 | 8/2003 | Woods |
| 2003/0212666 | A1 | 11/2003 | Basu et al. |
| 2004/0039562 | A1 | 2/2004 | Haase |
| 2004/0059564 | A1 | 3/2004 | Zhou |
| 2004/0059718 | A1 | 3/2004 | Zhou |
| 2004/0059730 | A1 | 3/2004 | Zhou |
| 2004/0243632 | A1* | 12/2004 | Beyer et al. ............... 707/104.1 |
| 2005/0004790 | A1* | 1/2005 | Wu et al. ............... 704/9 |
| 2005/0071365 | A1 | 3/2005 | Hou et al. |
| 2005/0080776 | A1 | 4/2005 | Colledge et al. |
| 2005/0187917 | A1* | 8/2005 | Lawande et al. ............... 707/3 |
| 2005/0273318 | A1 | 12/2005 | Zhou et al. |
| 2006/0101004 | A1* | 5/2006 | Matsubayashi et al. ............... 707/3 |
| 2006/0179074 | A1 | 8/2006 | Martin et al. |
| 2006/0253441 | A1 | 11/2006 | Nelson |
| 2007/0011154 | A1 | 1/2007 | Musgrove et al. |
| 2007/0174040 | A1 | 7/2007 | Liu et al. |
| 2007/0208691 | A1* | 9/2007 | Ramakrishnan ............... 707/2 |
| 2007/0239702 | A1* | 10/2007 | Vassilvitskii et al. ............... 707/5 |
| 2007/0299824 | A1 | 12/2007 | Pan et al. |
| 2008/0059187 | A1 | 3/2008 | Roitblat et al. |
| 2008/0109416 | A1 | 5/2008 | Williams |
| 2011/0010353 | A1 | 1/2011 | Wei et al. |

OTHER PUBLICATIONS

Supplementary European Search Report and European Search Opinion in Application No. EP 10736202.2, dated Apr. 15, 2013, 7 pages.
Park, Laurence A.F. and Ramamohanarao, Kotagiri, "Query Expansion Using a Collection Dependent Probabilistic Latent Semantic Thesaurus," ARC Centre for Perceptive and Intelligent Machines in Complex Environments, Department of Computer Science and Software Engineering, The University of Melbourne, May 22, 2007, pp. 224-235.
On the evaluation of document analysis components by recall, precision, and accuracy, Junker et al., Proceedings of the 5th ICDAR, India, pp. 713-716, 1999.
Automatic thesaurus construction, Lassi, 2002.
Query expansion behavior within a thesaurus-enhanced search environment: A user-centered evaluation, Shiri et al., Journal of the American Society for Information Science and Technology, 57(4); pp. 462-478, 2006.
The Loquacious User: A document-independent source of terms for query expansion, Kelly et al., SIGIR, pp. 457-464, ACM 2005.
Thesaurus construction through knowledge representation, Bechhofer et al., Data & Knowledge 37, pp. 25-45, 2001.
Concept-based ranking: a case study in the judicial domain, Silveira et al., Information Processing and Management 40, pp. 791-805, 2004.
Experiments in automation statistical thesaurus construction, Crouch et al., Proceedings of 15th Annual International SIGIR, pp. 77-88, 1992.
Integration of association rules and ontologies for semantic query expansion, Song et al., Data & Knowledge 63, pp. 63-75, 2007.
Construction of query concept based on feature clustering of documents, Chang et al., Information Retrieval 9, pp. 231-248, 2006.
ExpansionTool: Concept-Based query expansion and construction, Jarvelin et al., Information Retrieval, 4, pp. 231-255, 2001.
Automatic Query Expansion Using SMART: TERC 3, Buckley et al., TREC, 1994.
An association thesaurus for information retrieval, Jing et al., Proceedings of RIA, pp. 146-160, 1994.
Automatic Query Refinement Using Lexical Affinities with Maximal Information Gain, Carmel et al., SIFIR, pp. 283-290, 2002.
Automatic Query Expansion Based on Directed Divergence, Cai et al., Proceedings of the International Conference on Information Technology: Coding and Computing (ITCC), 2002.
An Information-Theoretic Approach to Automatic Query Expansion, Carpineto et al., ACM Transactions on Information Systems, 19(1), pp. 1-27, 2001.
Query Expansion by Mining User Logs, Cui et al., IEEE Transactions on Knowledge and data engineering, 15(4), 2003.
Information Retrieval by Semantic Similarity, Hilaoutakis et al., Int. J. Swis 2(3), pp. 55-73, 2006.
Hybrid pre-query term expansion using Latent Semantic Analysis, Park et al., Proceedings of the Fourth IEEE International Conference on Data Mining (ICDM), 2004.
Automatic query expansion via lexical-semantic relationships, Greenberg et al., Journal of the American Society for International Science and Technology, 52 (5), pp. 402-415, 2001.
Improving document retrieval by automatic query expansion using collaborative learning of term-based concepts, Klink et al., LNCS 2423, pp. 376-387, 2002.
Exploiting the similarity of non-matching terms at retrieval time, Crestani et al., International Retrieval, 2, pp. 25-45, 2000.
Evaluation of a Thesaurus-Based query expansion technique, Augusto et al., LNAI 2721, pp. 251-258, 2003.
Query expansion using heterogeneous thesauri, Mandala et al., Information processing and Management 36, pp. 361-378, 2000.
Combining multiple evidence from different types of Thesaurus for query expansion, Mandala et al., SIGIR, 1999.
Concept based query expansion, Qiu et al., SIGIR, 1993.
Interactive term suggestion for users of digital libraries: Using Subject Thesauri and co-occurrence lists for information retrieval, Schatz et al., DL, 1996.
Hersh et al., "Assessing Thesaurus-Based Query Expansion Using the UMLS Metathesaurus." In Proceedings of the 2000 American Medical Informatics Association (AMIA) Symposium, pp. 344-348.
International Search Report mailed Mar. 12, 2010, from the International Bureau of WIPO for corresponding International Application No. PCT/US10/21109, filed Jan. 15, 2010 (8 pages).
Gong et al., "Web Query Expansion by WordNet," International Conference on Database and Expert Systems Applications (DEXA), pp. 166-175, 2005.
Miller, "Wordnet: A Dictionary Browser," Proceedings of the First International Conference on Information Data, University of Waterloo, Waterloo, 1985.
Examination Report for New Zealand Patent Application No. 594175, dated Oct. 1, 2012, 2 pages.
Office Action mailed Nov. 23, 2012, for U.S. Appl. No. 12/362,940, filed Jan. 30, 2009.
Office Action mailed Nov. 8, 2011, for U.S. Appl. No. 12/362,940, filed Jan. 30, 2009.
Office Action mailed Jul. 8, 2011, for U.S. Appl. No. 12/362,940, filed Jan. 30, 2009.

* cited by examiner

METHODS AND SYSTEMS FOR CREATING AND USING AN ADAPTIVE THESAURUS

This application is a continuation of U.S. patent application Ser. No. 12/362,940, filed Jan. 30, 2009, which is incorporated herein by reference in its entirety.

BACKGROUND

1. Technical Field

The present disclosure generally relates to searching information. More particularly, and without limitation, the present disclosure relates to methods and systems for creating an adaptive thesaurus and for enhancing a search using an adaptive thesaurus.

2. Background Information

With vast amounts of information being stored in electronic form, search tools help users find specific information they are looking for. For example, Internet search engines enable users to search for specific information on the Internet, and database search tools enable users to search for specific information stored in large databases. However, conventional search techniques have several problems, discussed below.

In the search field, the term "recall" refers to the proportion of all relevant documents in a corpus of documents that is retrieved by a search. In a Boolean full-text search engine, a query for "automobile" will fail to retrieve or "recall" any text that refers to the concept of automobiles using the term "car." Therefore, a user who searches for "automobile" may fail to find important and desired documents containing text that instead discuss automobiles using the term "car." Expanding the search query to "automobile OR car" will retrieve or "recall" the text missed by the "automobile" query. Accordingly, one strategy for improving recall is to enhance a query by expanding the original terms of the query with synonyms obtained from a thesaurus.

However, in general, no two terms are perfectly synonymous, and thus expansion of one term with a second term will typically result in a loss of precision. That is, searching for "automobile OR car" rather than just "automobile" will likely return texts with references to railroad car, which is not encompassed in the automobile concept being searched by the user. The inclusion of such texts that are irrelevant to automobiles would therefore diminish the "precision" of the search result, which refers to the proportion of all retrieved documents that are relevant to a given concept. If precision falls too low, a simple query expansion may fail to effectively enhance the search.

A second method of expanding a query to enhance the recall of texts pertaining to a concept is known as "stemming." For example, the concept of "to consider" can be referenced in a text by any of the following morphological variants of "to consider," i.e., consider, considers, considered, considering, and consideration. These variants can each be used to expand the other. However, as with the example of the railroad car, expanding "consider" with a non-synonymous morphological variant (e.g., considerate) will undesirably diminish precision, again failing to enhance the search.

Thus, there are several potential problems associated with query expansion. As the preceding examples illustrate, although query expansion increases recall by increasing the number of documents retrieved, it also normally reduces precision. This follows mathematically from the fact that the number of retrieved documents appears in the denominator of the formula for calculating precision. Queries must therefore be expanded to increase recall without significantly decreasing precision.

Another problem with query expansion is data glut. A data glut occurs when a search returns more texts than can be analyzed by the user. Since query expansion normally results in the recall of more texts, query expansion often entails a risk of creating a data glut. To mitigate this problem, query expansion may be accompanied by a relevance ranking system. A popular ranking algorithm called "term frequency-inverse document frequency" (TF-IDF) can rank texts returned by a search by "relevance" and order the most relevant retrieved texts at the top of a result set, thereby mitigating the data glut problem. Even still, expansion of a query with terms that occur too frequently or that are insufficiently synonymous can still create a data glut that the ranking algorithms cannot sufficiently mitigate.

Furthermore, words of natural languages may be polysemous (have multiple meanings). For example, in the English language, the word "bow" may be a gesture, a weapon, the front of a ship, or a decoration. Thus, using a conventional thesaurus to expand a search query for "prow" with "bow" will retrieve many texts unrelated to prow and thereby appreciably diminish precision. Conventional, general-purpose thesauri are therefore unsuited to specific domains of knowledge, because they contain weak or false synonyms that unacceptably diminish precision. Conversely, special-purpose thesauri are unsuited to general domains, because they may not contain commonly-accepted synonyms, and may fail to adequately expand queries to enhance recall.

In addition, conventional statistical thesauri (also known as association thesauri) use co-occurrence matrices, wherein terms that co-occur in a text are deemed synonyms. However, such synonyms do not comport with the usual linguistic definition of synonyms as terms that individually refer to a single concept. For example, the terms gun and bullet often co-occur in the same document. Consequently, conventional statistical methods of thesaurus construction will find the terms gun and bullet in frequent co-occurrence and will consider these two terms synonyms. Therefore, context-free expansion of a term with such false synonyms can lead to a considerable loss of precision.

In view of the foregoing, there is a need for improved methods and systems that provide accurate search results.

SUMMARY

Disclosed embodiments relate to methods and systems for creating an adaptive thesaurus and for searching using an adaptive thesaurus.

In one embodiment, a computer-implemented method is provided for creating an adaptive thesaurus. The method comprises receiving a term pair including an index term and an expansion term. The method further comprises calculating, using a processor, a recall gain, an expansion independence, and a semantic similarity of the term pair. The method further comprises determining whether to store the term pair based on the recall gain, the expansion independence, and the semantic similarity. The method further comprises storing the term pair based on the determination.

In one embodiment, a system is provided for creating an adaptive thesaurus. The system comprises a computer comprising a processor. The processor executes instructions to receive a term pair including an index term and an expansion term. The processor further executes instructions to calculate a recall gain, an expansion independence, and a semantic similarity of the term pair. The processor further executes instructions to determine whether to store the term pair based on the recall gain, the expansion independence, and the semantic similarity. The processor further executes instructions to store the term pair based on the determination.

In one embodiment, a computer-readable storage medium is provided that includes instructions which, when executed by a processor, perform a method of normalizing strings. The method comprises receiving a term pair including an index term and an expansion term. The method further comprises calculating, using a processor, a recall gain, an expansion independence, and a semantic similarity of the term pair. The method further comprises determining whether to store the term pair based on the recall gain, the expansion independence, and the semantic similarity. The method further comprises storing the term pair based on the determination.

In one embodiment, a computer-implemented method is provided for searching using an adaptive thesaurus. The method comprises receiving a search query including a query term. The method further comprises retrieving an expansion term stored in association with an index term matching the query term in the adaptive thesaurus. The method further comprises expanding the search query using the expansion term based on a recall gain, an expansion independence, and a semantic similarity.

In one embodiment, a system is provided for searching using an adaptive thesaurus. The system comprises a computer comprising a processor. The processor executes instructions to receive a search query including a query term. The processor further executes instructions to retrieve an expansion term stored in association with an index term matching the query term in the adaptive thesaurus. The processor further executes instructions to expand the search query using the expansion term based on a recall gain, an expansion independence, and a semantic similarity.

In one embodiment, a computer-readable storage medium is provided that includes instructions which, when executed by a processor, perform a method for searching using an adaptive thesaurus. The method comprises receiving a search query including a query term. The method further comprises retrieving an expansion term stored in association with an index term matching the query term in the adaptive thesaurus. The method further comprises expanding the search query using the expansion term based on a recall gain, an expansion independence, and a semantic similarity.

In one embodiment, a computer-implemented method is provided for creating an adaptive thesaurus. The method comprises receiving a term pair including an index term and an expansion term. The method further comprises calculating, using a processor, a recall gain, an expansion independence, and a semantic similarity of the term pair. The method further comprises determining whether to store the index term and the expansion term based on the recall gain, the expansion independence, and the semantic similarity. The method further comprises storing the index term and the expansion term based on the determination. The method further comprises storing the recall gain, the expansion independence, and the semantic similarity in association with the index term and the expansion term.

It is to be understood that both the foregoing general description and the following detailed description are exemplary and explanatory only, and are not restrictive of the embodiments thereof, as claimed. Furthermore, features and variations may be provided in addition to those set forth herein. For example, embodiments may be directed to various combinations and sub-combinations of the features described in the detailed description.

BRIEF DESCRIPTION OF THE DRAWINGS

The accompanying drawings, which are incorporated in and constitute a part of this specification, illustrate various disclosed embodiments. In the drawings.

DETAILED DESCRIPTION

Figure 1:
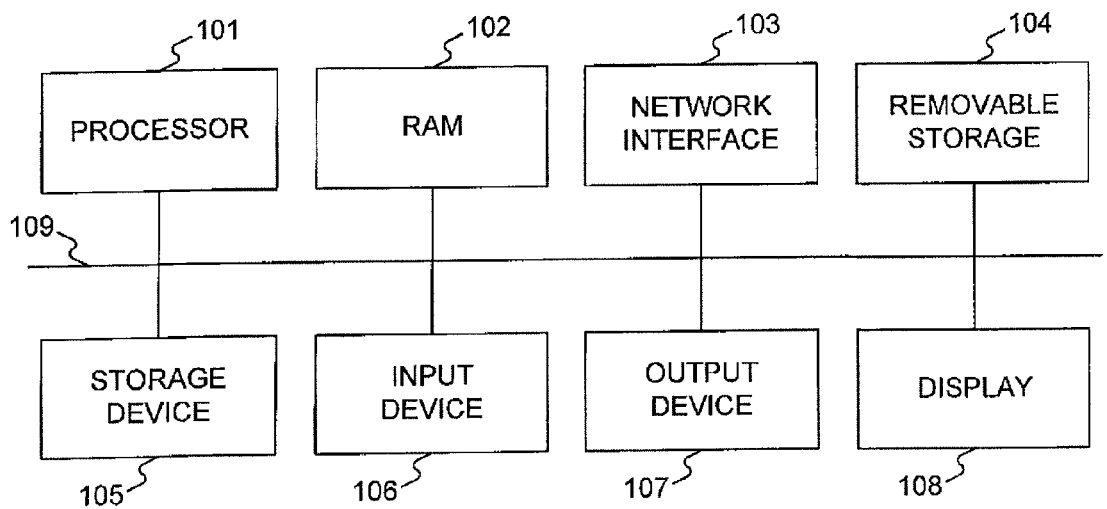
FIG. 1 illustrates an exemplary computer system, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations, and other implementations are possible. For example, substitutions, additions, or modifications may be made to the components illustrated in the drawings, and the exemplary methods described herein may be modified by substituting, reordering, or adding steps to the disclosed methods. Accordingly, the following detailed description is not limiting of the disclosed embodiments. Instead, the proper scope is defined by the appended claims.

At creation time, i.e., during construction or maintenance of the adaptive thesaurus, a corpus of texts is queried to calculate measures for expanding a given query term with an expansion term. The query term is stored in the adaptive thesaurus as an index term by which the expansion term and the measures are retrieved. At query time, i.e., when a user queries the corpus of texts, query terms provided by the user are matched to the index terms stored in the previously constructed adaptive thesaurus. Once so matched, "query term" and "index term" are used interchangeably.

FIG. 1 illustrates an exemplary computer system 100, consistent with a disclosed embodiment. Computer system 100 may implement exemplary systems and methods for creating and using an adaptive thesaurus.

In the example of FIG. 1, computer system 100 includes a processor 101 for executing instructions to perform processes related to creating and using an adaptive thesaurus, consistent with the disclosed embodiments. Processor 101 may be connected to a data bus 109, which connects various components of computer system 100. Computer system 100 may include a storage device 105 for storing the adaptive thesaurus and data related to the adaptive thesaurus. RAM 102 memory may be used by processor 101 as a placeholder for active data during the execution of instructions. Computer system 100 may also comprise one or more input devices 106, for example, a keyboard and/or a mouse. A network interface 103 may allow computer system 100 to communicate over a network such as an intranet, extranet, local area network (LAN), wide area network (WAN), or the Internet. Computer system 100 may comprise a removable storage 104 such as a floppy drive, CD-ROM, DVD-ROM, or USB flash drive. Computer system 100 may also comprise a display 108, such as a monitor. Display 108 is capable of displaying a graphical user interface to a user. Computer system 100 may also comprise an output device 107, such as a printer or a fax machine. Program instructions for executing the exemplary methods and implementing the exemplary systems for creating and using the adaptive thesaurus may be stored in storage device 105 or removable storage 104, or may be received via network interface 103. These program instructions may be executed by processor 101.

A "term" in this description may be a single word in a natural, mathematical, or artificial symbolic language, as well as a phrase consisting of a plurality of such words. The term "text" as used in this description may be multiple documents, a single document, or a subdocument. The term "texts" implies multiple documents or subdocuments.

Figure 2:
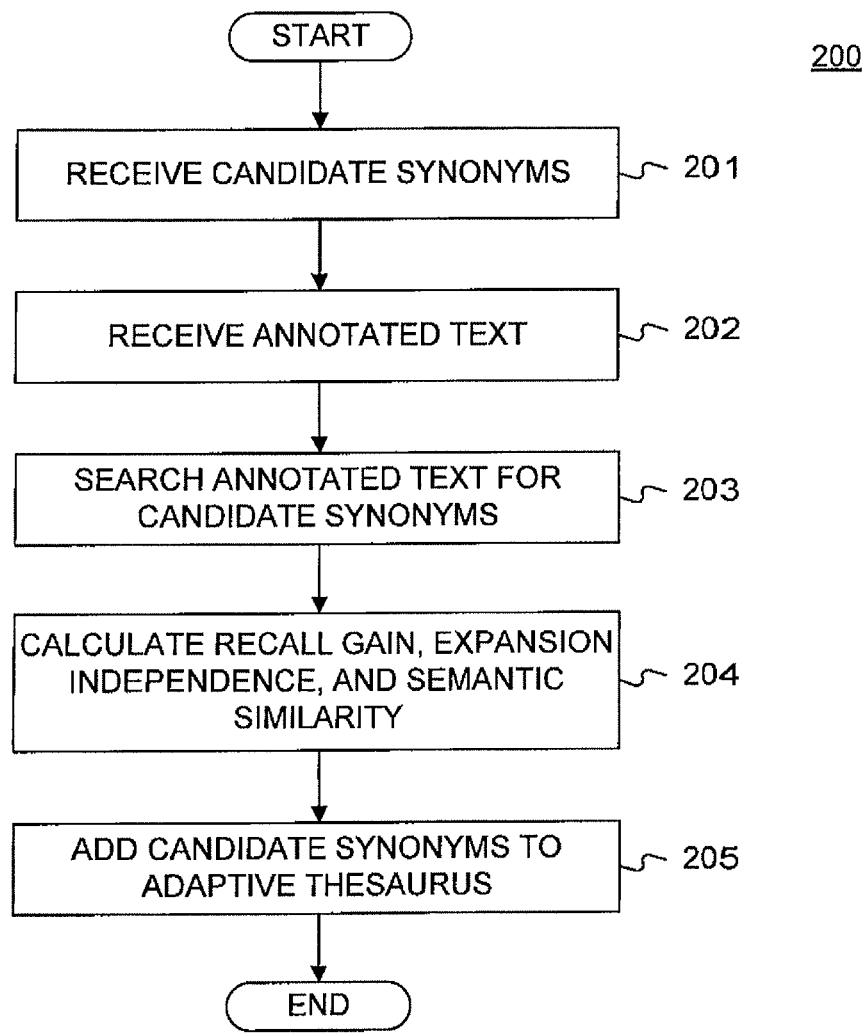
FIG. 2 is a flow chart of an exemplary method for creating an adaptive thesaurus, consistent with a disclosed embodiment.

FIG. 2 is a flow chart of an exemplary method 200 for creating an adaptive thesaurus, consistent with a disclosed embodiment.

In step 201, computer system 100 receives sets of term pairs. For example, the term pairs may be received via network interface 103 from another computer. Alternatively, the term pairs may be retrieved from a thesaurus stored in storage device 105 of computer system 100. As another alternative, the term pairs may be inputted by a user through input device 106 or through removal storage 104 such as a CD-ROM containing a thesaurus. The received term pairs may be stored in storage device 105.

In one embodiment, a term pair may be an ordered pair of putative synonyms. For example, where a conventional thesaurus gives "bow" as a synonym for "prow," computer system 100 would receive both {bow, prow} and {prow, bow} as term pairs. For each term pair, the first term may be designated as the index term and the second term may be designated as the expansion term.

In one embodiment, the term pairs are morphological variants of a stem (or root) term, provided from a conventional dictionary or provided by a conventional stemming algorithm. In another embodiment, computer system 100 may receive term pairs from a user search query consisting of terms conjoined with Boolean operators. In another embodiment, term pairs may be determined from a sampling of queries provided by users using various Boolean combinations of terms. In another embodiment, term pairs are provided by a conventional or statistical thesaurus.

In step 202, computer system 100 receives a corpus of text that is annotated with semantic features.

In one embodiment, the corpus of text has been annotated with semantic features. The semantic features may be, for example, legal topics such as those described in U.S. Pat. No. 6,502,081, entitled "System and Methods for Classifying Legal Concepts Using Legal Topic Scheme," the disclosure of which is incorporated herein by reference in its entirety.

As another example, citations to statutes in judicial opinions may be considered semantic features. The corpus of text may have been indexed with semantic features by one or more semantic indexing methods. The annotated text may be received via network interface 103, removable storage 104, or input device 106, or extracted from storage device 105.

In step 203, for each term pair, computer system 100 searches, using a search engine, the corpus of annotated text for the index term. Computer system 100 also searches the corpus for the expansion term. Computer system 100 also searches the corpus of annotated text for the index term and the expansion term conjoined by a Boolean OR. Computer system 100 also searches the corpus of annotated text for the index term and the expansion term conjoined by a Boolean AND. For example, where the term pair is {automobile, car}, computer system 100 searches the corpus of annotated text for "automobile," "car," "automobile OR car," and "automobile AND car." The search engine may be any conventional Boolean search engine capable of finding specific terms in a corpus of texts. The search engine may be implemented by software, hardware, or a combination of both.

Furthermore, computer system 100 calculates metadata for each term pair. The metadata may comprise a semantic feature vector for each term pair and measures including a recall gain, an expansion independence, and a semantic similarity. The semantic feature vectors may be comprised of keywords editorially applied to the individual texts of the corpus. The semantic feature vectors may be constructed by, for example, counting how often each semantic annotation type in the corpus of annotated texts occurs in each document of the corpus. For example, vector $F_i$ for index term i and vector $F_e$ for expansion term e may be constructed.

In step 204, computer system 100 calculates the recall gain and the expansion independence based on the results of the searches in step 203. In addition, computer system 100 calculates the semantic similarity based on the feature vectors calculated in step 203. The calculation of these measures is explained below.

The recall gain G may be calculated by the following formula:

$$G = 1 - \frac{i}{i \cup e},$$

and the expansion independence I may be calculated by the following formula:

$$I = 1 - \frac{i \cap e}{i},$$

where i is the document frequency of the index term in the corpus of annotated text, (i∪e) is the document frequency of the index term OR'ed with the expansion term, and (i∩e) is the document frequency of the index term AND'ed with the expansion term.

The recall gain G represents the proportion of documents in the (i OR e) result set contributed by expanding index term i with expansion term e. The expansion independence I represents the proportion of documents in the result set of the query for index term i that do not contain expansion term e. For example, if index term i is "Chrysler" and expansion term e is "automobile," almost all documents containing "Chrysler" may also contain "automobile." Thus, the expansion independence I will be low. When expansion independence I is low, index term i is an effective hyponym of expansion term e. When a user uses a query term like "Chrysler," automatic expansion by a more generic term like "automobile" is likely to produce a data glut. Conversely, a high value for the expansion independence I implies that index term i is an effective hypernym of expansion term e.

The semantic similarity may be calculated from the vector of the semantic features of the corpus of text. The semantic similarity may be calculated as:

$$r(F_q, F_e),$$

where r is the Pearson product moment correlation coefficient. The semantic similarity represents a shared feature variance or similarity between the query term and the expansion term.

Other formulas and/or different correlation methods may be used to calculate the recall gain, the expansion independence, and the semantic similarity.

Alternatively, in one embodiment, the semantic similarity may be available from an existing statistical thesaurus. For example, rather than calculating the semantic similarity, computer system 100 may retrieve the semantic similarity from a statistical thesaurus in which a semantic similarity has already been calculated. The statistical thesaurus may be stored in storage device 105 or reside outside computer system 100 such that it is accessible by computer system 100.

In step 205, computer system 100 adds the term pairs to the adaptive thesaurus. The adaptive thesaurus may be, for example, a flat text file, an eXtensible Markup Language (XML) file, or a database including a set of synonyms. The adaptive thesaurus may be created by computer system 100 and stored in storage device 105 at initial creation of the adaptive thesaurus. The adaptive thesaurus stored in storage device 105 may be modified during creation and updating of the adaptive thesaurus by adding synonyms to the adaptive thesaurus. Alternatively, computer system 100 may store and access the adaptive thesaurus from a storage location accessible via network interface 103.

In one embodiment, term pairs whose calculated measures do not exceed predefined thresholds may be discarded. The discarded term pairs are not stored in the adaptive thesaurus, and computer system 100 moves on to evaluating other term pairs. In this embodiment, the recall gain G is compared with a recall gain threshold before adding a term pair to the adaptive thesaurus. For example, if expanding a search for index term i with expansion term e results in only negligible increase in recall (viz., low recall gain G), then such an expansion adds little benefit to the user at the cost of unnecessary computation. The recall gain threshold sets a minimum value for the recall gain G to prevent such an expansion.

The expansion independence I is compared with an expansion independence threshold before adding the term pair, i and e, to the adaptive thesaurus. For example, if the expansion independence I is low, then most documents containing index term i also contain expansion term e, then, in one embodiment, these term pairs may not be added to the adaptive thesaurus.

The semantic similarity r is compared with a semantic similarity threshold before the term pair, i and e, are added to the adaptive thesaurus. The semantic similarity r, in the case of a Pearson product moment correlation coefficient, ranges from −1 to 1, inclusive, where a value of 1 represents a perfect and positively linear relationship between the semantic feature vector $F_i$ and the semantic feature vector $F_e$, a value of −1 represents a perfect and linear but inverse relationship between the semantic feature vector $F_i$ and the semantic feature vector $F_e$, and a value of 0 represents no linear relationship. The use of the semantic similarity threshold ensures that a search for index term i will be expanded by expansion term e only if the two terms are sufficiently semantically similar.

In one embodiment, term pairs are included in the adaptive thesaurus if all three measures (the recall gain, the expansion independence, and the semantic similarity) satisfy their respective thresholds. Other rules for inclusion or exclusion of term pairs in the adaptive thesaurus are possible. For example, the three measures may be weighted by additional factors and conjoined in a linear or nonlinear model/formula to determine whether to include or exclude term pairs in the adaptive thesaurus.

The above-described steps 201 to 205 may be repeated for each pair of terms in the received sets of term pairs to determine whether to include or exclude the term pairs in the adaptive thesaurus.

In one embodiment, the three calculated measures (the recall gain, the expansion independence, and the semantic similarity) are stored in the adaptive thesaurus in association with their respective synonyms, enabling expansion tuning at query time, as described below. In another embodiment, the measures are stored in the adaptive thesaurus as query weights to be used to rank or re-rank search results at query time. The measures and the weights may be stored in the adaptive thesaurus in a flat text file, a markup language format, a table, or a database, in association with their corresponding synonyms. The semantic features vectors may also be stored in the adaptive thesaurus in association with the term pair.

The created adaptive thesaurus may be stored in storage device 105, for example, to be used at query time; written to removable storage 104, such as a floppy disk; transmitted to an electronic device via network interface 103; or displayed to a user on display 108.

Figure 3:
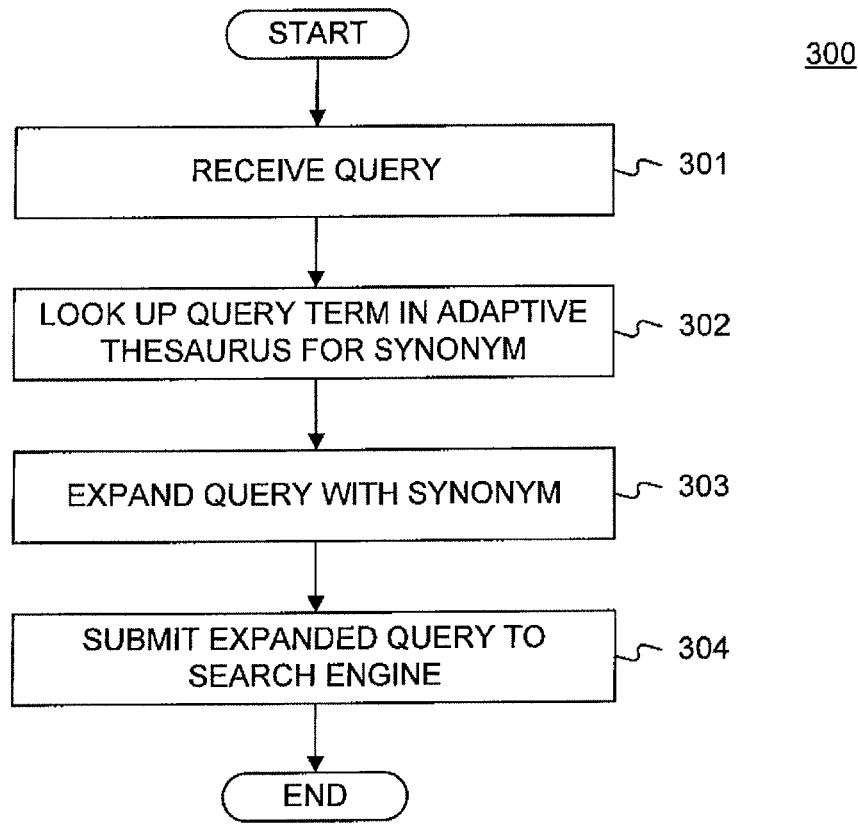
FIG. 3 is a flow chart of an exemplary method for using an adaptive thesaurus at query time, consistent with a disclosed embodiment.

FIG. 3 is a flow chart of an exemplary method 300 for using an adaptive thesaurus at query time, consistent with a disclosed embodiment In step 301, computer system 100 receives a search query. The search query may be inputted by a user through a graphical user interface displayed on display 108 by using input device 106. Alternatively, the search query may be received by computer system 100 via network interface 103 from an electronic device. The search query may contain one or more query terms.

In step 302, computer system 100 looks up each query term in an adaptive thesaurus for expansion terms. That is, computer system 100 searches the adaptive thesaurus for an index term that matches the query term and then retrieves one or more expansion terms that are stored in association with the matched index term. Where the lookup succeeds, the query term and the index term are effectively identical and the two terms may be used interchangeably.

In one embodiment, an expansion term corresponding to the query term that is found in the adaptive thesaurus automatically has been prequalified as an expansion term in steps 201 to 205, as described above (i.e., at thesaurus creation time).

Alternatively, in another embodiment, an expansion term corresponding to the query term is found in the adaptive thesaurus, but must be tested at query time to determine that the expansion term qualifies. The test involves calculating the recall gain, the expansion independence, and the semantic similarity for the query term and the expansion term; and determining whether the calculated three measures exceed their respective thresholds or a conjoint threshold, similar to the above description of step 204. The test may be based on one or more of the three measures.

The thresholds may be predetermined values, e.g., values specifically set for computer system 100 and capable of being changed. Alternatively, the thresholds may be inputted or set by the user performing the search. For example, computer system 100 may display adjustable bars or tunable knobs on a graphical user interface, which the user may change at query time. The three thresholds may be adjusted individually or together.

In one embodiment, where the three measures are stored in the adaptive thesaurus, computer system 100 may retrieve the stored measures for the query term and the expansion term to determine whether the expansion term satisfies the thresholds. In one embodiment, even if the three measures are stored in the adaptive thesaurus, the three measures may be calculated again at query time against a different corpus of text (e.g., an updated corpus of text, a corpus of text with updated external semantic features, or the corpus of text being searched at query time) or against a new matrix of feature vectors. The newly calculated measures may be stored in the adaptive thesaurus, perhaps to update the previously-stored measures.

In step 303, the search query is expanded by the expansion term found in the adaptive thesaurus. Expansion of query term q by expansion term e involves replacing q with (q OR e), that is, the original query term and its synonym are joined by a Boolean OR.

In one embodiment, the qualifying expansion term is automatically used to expand the search query. Alternatively, the expansion term (and possible multiple expansion terms) may be displayed to the user on display 108, enabling the user to choose whether or not to expand the search by particular choices of candidate expansion terms. Moreover, the user could adjust and fine-tune the thresholds to increase or decrease the number of potential expansion terms displayed. Upon receiving the user's selection of an expansion term or terms, computer system 100 expands the query term by the user-selected expansion term(s).

In another embodiment, an expansion may be categorized as a hypernym expansion or a hyponym expansion, based upon the expansion independence of the term pair.

In step 304, computer system 100 submits the expanded search query to a search engine. In one embodiment, computer system 100 hosts the search engine, in which case, computer system 100 would perform the search using the expanded search query. In another embodiment, the search engine may be hosted by another system, in which case, computer system 100 can transmit the expanded search query via network interface 103. In another embodiment, computer system 100 displays the expanded search query to the user, who in turn will input the expanded search query to the search engine. Furthermore, computer system 100 may submit the weights of the expansion terms stored in the adaptive thesaurus to the search engine to be used to fine-tune the ranking of the search result.

In one embodiment, where the term pairs have been stored along with their feature vectors, the pair-wise semantic similarity computed at step 204 may be ignored and a multidimensional semantic similarity for each term pair can be recomputed from the retrieved matrix of feature vectors and applied at query time.

After the completion of method 300, the search engine may perform the search using the expanded search query and return a set of search results.

In one embodiment, where the search engine does not accept weights based upon the measures, computer system 100 re-ranks the research result returned by the search engine using weights derived from the measures.

In one embodiment, an adaptive thesaurus may be updated by performing the above-described method 200. An adaptive thesaurus may be updated with newer editions of thesauri or dictionaries or with special-purpose thesauri or dictionaries particular to a specific field.

In one embodiment, an adaptive thesaurus may be updated based on a search query from a user. For example, upon receiving a search query for (Zune OR iPod) from a user, computer system 100 searches a corpus of text for these potential synonyms, as described in step 203; calculates three measures, as described in step 204; and adds the query terms as term pairs to the adaptive thesaurus, as described in step 205. This process enables continual and incremental updates of the adaptive thesaurus by adding synonyms of terms provided by users, which may not be typically found in standard thesauri or dictionaries.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, microprocessors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for searching using an adaptive thesaurus, comprising:
   receiving a search query including a query term;
   retrieving, from the adaptive thesaurus, an expansion term stored in association with an index term matching the query term, wherein metadata is stored in association with the expansion term and the index term, and the metadata includes:
   a recall gain meeting a recall gain threshold, wherein the recall gain identifies a value of expanding the search query to another term versus a computational cost;
   an expansion independence meeting an expansion independence threshold; and
   a semantic similarity meeting a semantic similarity threshold; and
   expanding, using a processor, the search query using the expansion term.

2. The method of claim 1, further comprising:
   submitting the expanded search query to a search engine.

3. The method of claim 1, further comprising:
   using the recall gain, the expansion independence, and the semantic similarity to rank a search result.

4. The method of claim 1, further comprising:
   calculating, before expanding the search query, at least one of the recall gain, the expansion independence, and the semantic similarity for the expansion term and the index term; and
   comparing at least one of the recall gain, the expansion independence, and the semantic similarity with at least one of the recall gain threshold, the expansion independence threshold, the semantic similarity threshold, and a conjoint threshold.

5. The method of claim 1, further comprising:
displaying the expansion term to a user; and
enabling the user to select the displayed expansion term for expanding the search query.

6. The method of claim 5, wherein the expansion independence of the displayed expansion term is lower than the expansion independence threshold.

7. The method of claim 1, further comprising:
enabling a user to adjust one or more of the recall gain threshold, the expansion independence threshold, and the semantic similarity threshold.

8. A system for searching using an adaptive thesaurus, comprising:
a computer comprising a processor, the processor executing instructions to:
receive a search query including a query term;
retrieve, from the adaptive thesaurus, an expansion term stored in association with an index term matching the query term, wherein metadata is stored in association with the expansion term and the index term, and the metadata includes:
a recall gain meeting a recall gain threshold;
an expansion independence meeting an expansion independence threshold, wherein the expansion independence identifies a likelihood that the expansion term will yield different results than the query term; and
a semantic similarity meeting a semantic similarity threshold; and
expand, using a processor, the search query using the expansion term.

9. The system of claim 8, wherein the processor further executes instructions to submit the expanded search query to a search engine.

10. The system of claim 8, wherein the processor further executes instructions to use the recall gain, the expansion independence, and the semantic similarity to rank a search result.

11. The system of claim 8, wherein the processor further executes instructions to:
calculate, before expanding the search query, at least one of the recall gain, the expansion independence, and the semantic similarity for the expansion term and the index term; and
compare at least one of the recall gain, the expansion independence, and the semantic similarity with at least one of the recall gain threshold, the expansion independence threshold, the semantic similarity threshold, and a conjoint threshold.

12. The system of claim 8, wherein the processor further executes instructions to:
display the expansion term to a user; and
enable the user to select the displayed expansion term for expanding the search query.

13. The system of claim 12, wherein the expansion independence of the displayed expansion term is lower than the expansion independence threshold.

14. The system of claim 8, wherein the processor further executes instructions to enable a user to adjust one or more of the recall gain threshold, the expansion independence threshold, and the semantic similarity threshold.

15. A non-transitory computer-readable storage medium including instructions that, when executed by a processor, perform a method for searching using an adaptive thesaurus, the method comprising:
receiving a search query including a query term;
retrieving, from the adaptive thesaurus, an expansion term stored in association with an index term matching the query term, wherein metadata is stored in association with the expansion term and the index term, and the metadata includes:
a recall gain meeting a recall gain threshold;
an expansion independence meeting an expansion independence threshold; and
a semantic similarity meeting a semantic similarity threshold, wherein the semantic similarity is utilized to determine whether a new term will be added to the search query based on whether the query term and a new term are semantically similar; and
expanding, using a processor, the search query using the expansion term.

16. The computer-readable storage medium of claim 15, wherein the method further comprises:
submitting the expanded search query to a search engine.

17. The computer-readable storage medium of claim 15, wherein the method further comprises:
using the recall gain, the expansion independence, and the semantic similarity to rank a search result.

18. The computer-readable storage medium of claim 15, wherein the method further comprises:
calculating, before expanding the search query, at least one of the recall gain, the expansion independence, and the semantic similarity for the expansion term and the index term; and
comparing at least one of the recall gain, the expansion independence, and the semantic similarity with at least one of the recall gain threshold, the expansion independence threshold, the semantic similarity threshold, and a conjoint threshold.

19. The computer-readable storage medium of claim 15, wherein the method further comprises:
displaying the expansion term to a user; and
enabling the user to select the displayed expansion term for expanding the search query.

20. The computer-readable storage medium of claim 19, wherein the expansion independence of the displayed expansion term is lower than the expansion independence threshold.

21. The computer-readable storage medium of claim 15, wherein the method further comprises:
enabling a user to adjust one or more of the recall gain threshold, the expansion independence threshold, and the semantic similarity threshold.

* * * * *